Figure 1:
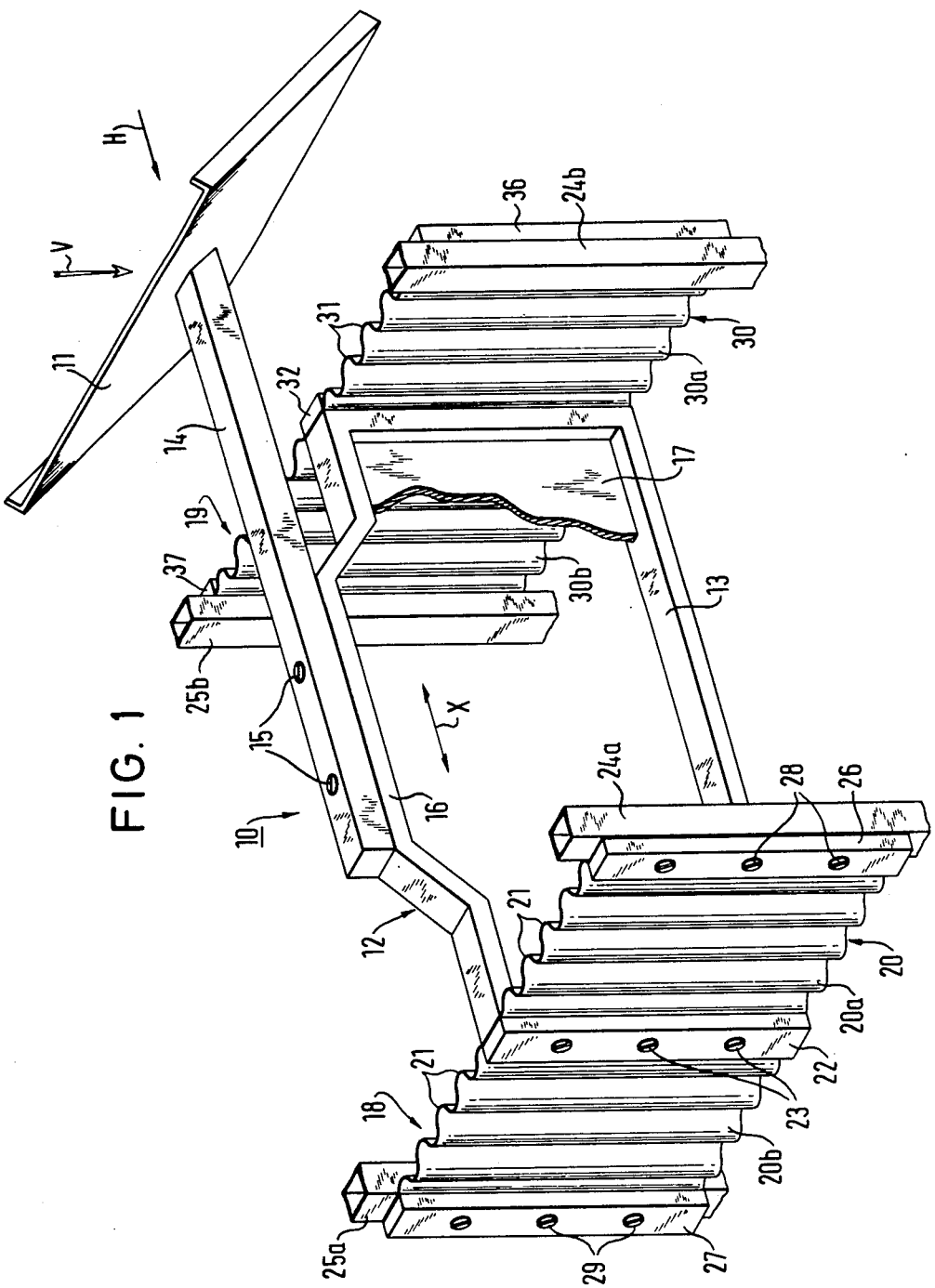

United States Patent [19]

Pfeiffer

[11] Patent Number: 4,718,285
[45] Date of Patent: Jan. 12, 1988

[54] BULK FLOW METER

[75] Inventor: Helmut Pfeiffer, Lörrach, Fed. Rep. of Germany

[73] Assignee: Endress u. Hauser GmbH u. Co., Fed. Rep. of Germany

[21] Appl. No.: 852,521

[22] Filed: Apr. 16, 1986

[30] Foreign Application Priority Data

Apr. 25, 1985 [DE] Fed. Rep. of Germany ....... 3514986

[51] Int. Cl.⁴ ................................................ G01F 1/20
[52] U.S. Cl. ..................................... 73/861.73; 222/55
[58] Field of Search ............ 73/861.71, 861.72, 861.73, 73/861.74, 861.75; 267/73, 136, 160; 222/55, 71

[56] References Cited

U.S. PATENT DOCUMENTS

| | | | |
|---|---|---|---|
| 2,601,678 | 6/1952 | Beatty | 73/861.74 X |
| 3,097,536 | 7/1963 | Young | 73/862.63 X |
| 3,557,616 | 1/1971 | Landon, Jr. et al. | |
| 4,543,835 | 10/1985 | Volk, Jr. et al. | 73/861.7 |
| 4,550,616 | 11/1985 | Mott | 73/861.74 |

FOREIGN PATENT DOCUMENTS

| | | |
|---|---|---|
| 1178268 | 9/1964 | Fed. Rep. of Germany . |
| 2534096 | 2/1977 | Fed. Rep. of Germany . |
| 3149715 | 6/1983 | Fed. Rep. of Germany . |
| 1537785 | 1/1979 | United Kingdom . |

Primary Examiner—Herbert Goldstein
Attorney, Agent, or Firm—Barnes & Thornburg

[57] ABSTRACT

The bulk flow meter comprises a baffle plate which is arranged inclined in the fall path of the bulk material to be measured and is carried by a rigid support which is mounted displaceably in the direction of a horizontal axis on at least two spring systems which are spaced apart from each other and secured on the one hand to the baffle plate support and on the other hand to the frame, each spring system having at least one pair of spring members arranged opposite each other on either side of the baffle plate support. Each spring member is formed by a corrugated diaphragm section with vertically extending corrugations. The corrugated diaphragms provide a mounting of the baffle plate support with high transverse stability so that it is possible to arrange the baffle plate without modifying the suspension optionally in the longitudinal direction of the baffle plate support or in the transverse direction laterally adjacent the baffle plate support.

10 Claims, 3 Drawing Figures

BULK FLOW METER

The invention relates to a bulk flow meter comprising at least one baffle plate which is connected to a rigid support which is mounted displaceably in the direction of a horizontal axis on at least two spring systems which are in spaced relationship with each other and are secured on the one hand to the baffle plate support and on the other to the frame, each spring system comprising two spring members lying opposite each other on either side of the baffle plate support.

As is known, the measurement of the mass throughput of bulk materials with bulk flow meters of this type is effected in that the impact or momentum exerted on the baffle plate by the bulk material is converted into a displacement-proportional or force-proportional quantity and integrated with respect to time. To keep the system statically largely independent of the inertia and gravity forces such as baffle plate weight, incrustation, etc., for the throughput measurement only the horizontal force component is evaluated. This requires that the baffle or impact plate is coupled to a mechanism which executes at least one horizontal rectilinear or parallel movement. Such rectilinear or parallel mechanisms are usually complicated in their construction.

In a bulk flow meter of the type mentioned at the beginning known from DE-PS No. 3,149,715 each spring member is formed by a spring joint which has three parallel leaf spring legs which are connected together by a cross web and which at points at equal distances from the cross web are clamped to the support or frame respectively. This known suspension of the baffle plate support can however only be subjected to a limited load and further requires that the baffle plate is arranged symmetrically with respect to the vertical plane containing the horizontal adjustment axis because with a laterally offset arrangement of the baffle plate a tilting moment results which cannot be taken up by the spring joints.

The problem underlying the invention is to provide a bulk flow meter of the type mentioned whose spring systems are made very simply, do not require complicated assembly and production steps and have a high transverse stability so that there is no restriction as regards the arrangement of the baffle plate.

According to the invention this problem is solved in that each spring member is formed by a corrugated diaphragm section with vertically extending corrugations.

The form of the bulk flow meter according to the invention provides a completely rectilinear guiding of the baffle plate support in the horizontal axis of the adjustment movement. The assembly is very simple; in particular no complicated adjustments are necessary. The spring systems are very robust so that they can take up high loads but on the other hand are also sensitive to small measuring forces. In particular, the spring members formed by corrugated diaphragm sections have a high stability with respect to movements in the transverse direction and against tilting movements about the axes of the baffle plate support. This makes it possible to arrange the baffle plate without modifying the suspension optionally in the longitudinal direction of the baffle plate support or in the transverse direction laterally adjacent the baffle plate support. Finally, in simple manner compensation of the temperature-induced changes of the spring systems is possible.

Advantageous further developments and embodiments of the invention are characterized in the subsidiary claims.

Figure 2:
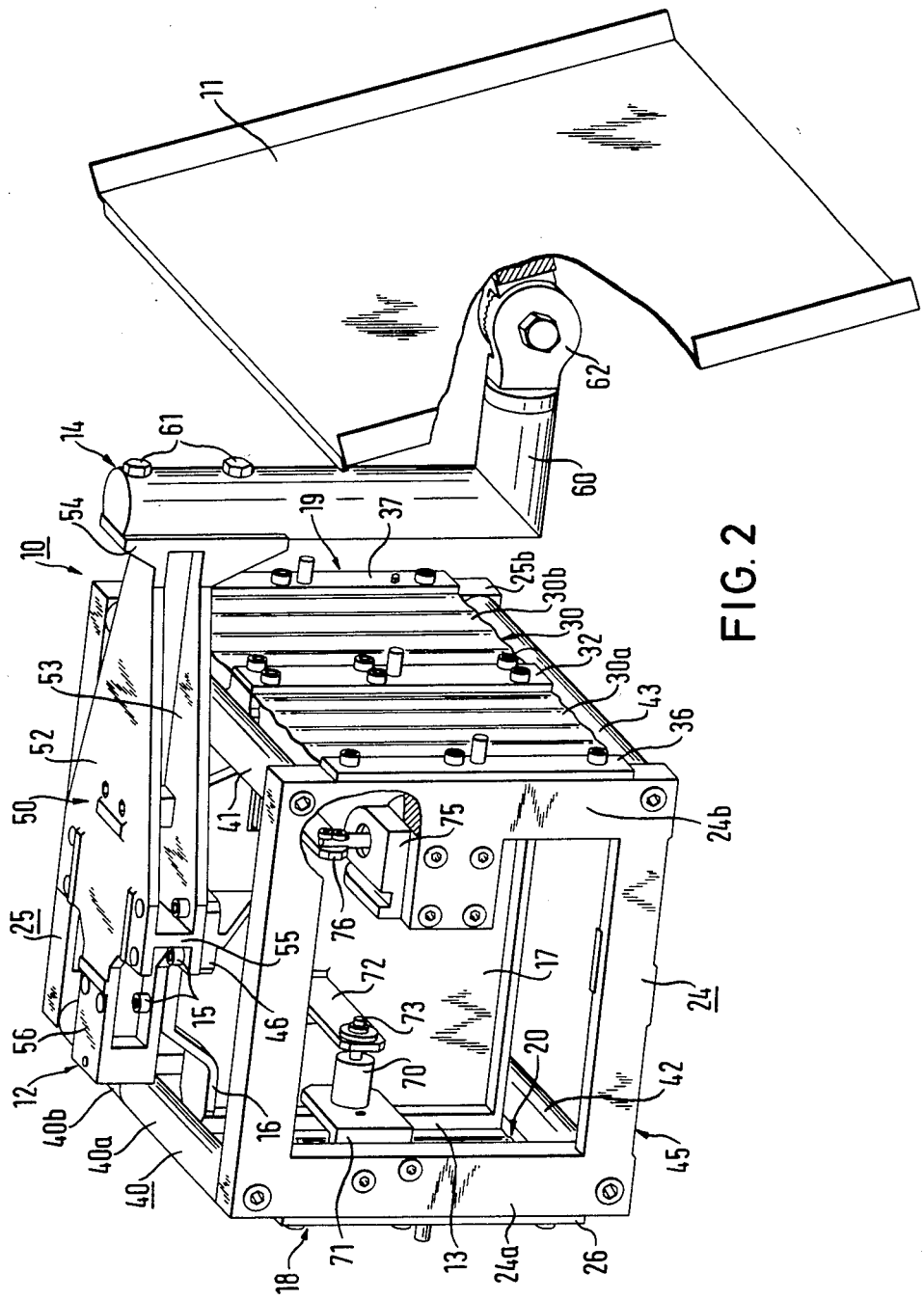
Figure 3:
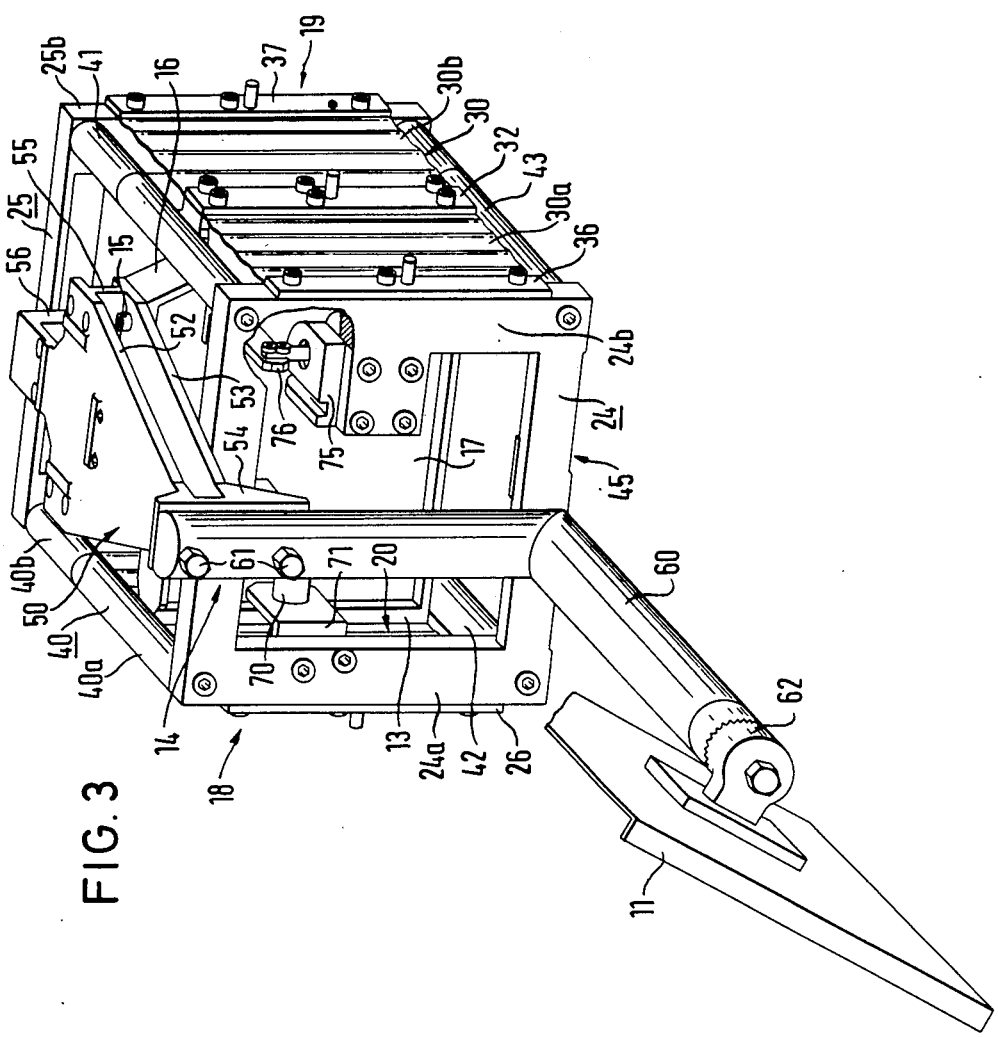

Further features and advantages of the invention will be apparent from the following description of an example of embodiment illustrated in the drawings, wherein:

FIG. 1 is a very simplified schematic illustration of the bulk flow meter for explaining the principle of the invention, FIG. 2 is a perspective view of the bulk flow meter with one arrangement of the baffle plate and FIG. 3 shows the bulk flow meter of FIG. 2 with another arrangement of the baffle plate.

The bulk flow meter illustrated very simplified and schematically in FIG. 1 comprises a movable system 10 having an impact or baffle plate 11 and a baffle plate support 12. The baffle plate 11 is disposed inclined in the fall path of bulk material falling in the direction of the arrow V. The baffle plate support 12 consists of a substantially rectangular frame 13 and a cantilever arm 14 which is secured by screws 15 to the upwardly bent upper longitudinal web 16 of the frame 13. The cantilever arm 14 is shown simplified in FIG. 1 as straight beam which carries at the end the baffle plate 11. The frame 13 is stiffened by a plate 17 filling said frame and shown in FIG. 1 broken away to enable the individual parts therebehind to be seen. The construction of the frame described gives very great stiffness with relatively low weight.

The movable system 10 is suspended by two spring systems 18 and 19 in such a manner that it is horizontally displaceable in the direction of the longitudinal axis X of the baffle plate support 12 against the return force of the spring systems. In accordance with the known mode of operation of bulk flow meters the bulk material on striking the baffle plate 11 is deflected out of its falling direction. The impact or momentum exerted on the baffle plate 11 produces a horizontal force component in the direction of the arrow H which tends to displace the movable system 10 against the return force of the spring systems 18 and 19. Said spring component or the horizontal displacement travel caused thereby against the spring force of the spring systems are a measure of the impact exerted on the baffle plate 11 by the bulk material which in turn for a known fall height of the bulk material is a measure of the mass throughput of the bulk material. Thus, a force or displacement sensor connected to the movable system 10 furnishes a signal which indicates the mass throughput.

The two spring systems 18 and 19 are formed in the same manner with two spring members which are independent of each other and are arranged symmetrically to each other on either side of the baffle plate support. In the spring system 18 the two spring members are formed by the two halves of a corrugated diaphragm 20 which is arranged perpendicularly to the axis X of the baffle plate support 12 in such a manner that its parallel corrugations 21 extend vertically. The baffle plate support 12 is secured in the centre of the corrugated diaphragm 20. In the example illustrated for this purpose a centre strip of the corrugated diaphragm not provided with corrugations is clamped over the entire height thereof between a vertical web of the frame 13 and a strip 22 by means of screws 23. The two vertical edges of the corrugated diaphragm 20 are anchored to stationary frame members 24a and 25a respectively which in the example illustrated have the form of vertical posts. As shown this anchoring can be effected in that the edge portions of the corrugated diaphragm 20 not provided with corrugations are clamped over their entire height between the posts 24a, 25a and strips 26, 27 by means of screws 28, 29. Each of the two corrugated sections 20a, 20b of the corrugated diaphragm 20 thus form one of the two spring members, independent of each other, of the spring system 18.

The spring system 19 comprises in similar manner a corrugated diaphragm 30 with parallel corrugations 31 which is arranged perpendicularly to the axis X in such a manner that its corrugations 31 extend vertically. The two corrugated diaphragms 20 and 30 thus lie parallel to each other. The vertical centre strip of the corrugated diaphragm 30 is clamped between the other vertical web of the frame 13 and a strip 32 and the vertical edge portions of the corrugated diaphragm 30 are clamped between stationary frame members 24b, 25b and strips 36, 37. The two corrugated sections 30a, 30b of the corrugated diaphragm 30 form the two spring members, independent of each other, of the spring system 19.

The arrangement illustrated of the spring systems 18, 19 with vertical corrugated diaphragms 20, 30 permits horizontal movement of the movable system 10 against a defined return force but offers a high resistance to any movement or deflection of the movable system in any other direction. In particular the corrugated diaphragms 20 and 30 provide great stiffness against movements in the vertical direction and against tilting movements about the three axes of the system. This gives a very precise rectilinear or parallel guiding of the movable system 10 which is required for exact measurement of the mass throughput. Vertical inertia or gravity forces such as the baffle plate weight and any settlements of bulk material do not impair the measurement accuracy.

It is further not necessary for the baffle plate 11 to be arranged symmetrically with respect to the vertical plane containing the axis X. This makes it possible in particular to arrange the baffle plate 11 laterally adjacent the spring systems 18, 19 as is desired in many uses. To do this it suffices to arrange the cantilever arm 14 not parallel as shown in FIG. 1 but transversely of the frame 13, the connection between the baffle plate 11 and the cantilever arm 14 then of course having to be altered so that the direction H of the horizontal force component again extends parallel to the axis X.

These various possibilities are apparent from the example of embodiment of a bulk flow meter illustrated in FIGS. 2 and 3 in detail.

Apparent in FIGS. 2 and 3 are again the components illustrated schematically in FIG. 1 of the bulk flow meter which are provided with the same reference numerals as in said Figure but which differ therefrom in the details of the constructional form described below.

The frame members 24a, 24b are the vertical webs of a very robust rectangular profile frame 24 and in the same manner the frame members 25a, 25b are the vertical webs of a profile frame 25 formed in the same manner. The two profile frames 24, 25 are connected together at the four corners by four cylindrical connecting members 40, 41, 42, 43. In this manner a very robust and strong twist-resistant frame 45 is formed which has the shape of a right parallelepiped or cube. The profile frames 24 and 25 are preferably aluminium castings. The cylindrical connecting members 40, 41, 42, 43 lie parallel to the corrugated diaphragms 20, 30. This construction of the frame 45 permits in simple manner the adjustment of the pretensioning of the corrugated diaphragms and the compensation of temperature-induced length changes of the corrugated diaphragms in a manner which will be explained in detail hereinafter.

The illustrations of FIGS. 2 and 3 also show the purpose of the bending of the upper longitudinal web 16 of the frame 13: this bending is so dimensioned that the cantilever arm 14 for any securing projects freely beyond the upper edge of the frame 45.

The upper longitudinal web 16 has the form of a cross with transverse arms 46 which project in the centre towards both sides and of which in FIG. 2 only the forwardly projecting transverse arm 46 can be seen. The transverse arms 46 permit a secure mounting of the cantilever arm 14 both in the longitudinal direction (FIG. 2) and in the transverse direction (FIG. 3).

The cantilever arm 14 consists of two parts, that is a horizontal bracket 50 and a support arm 60. The bracket is a one-piece casting, preferably of aluminium, comprising two superimposed spaced apart plates 52, 53 of substantially triangular cross-section which are connected together at the narrow ends projecting beyond the frame 45 by a vertical flange 54. The widest points of the plates 52, 53 have substantially the width of the transverse arms 46 and are connected together by a transverse web 55 and by a rearwardly projecting U-shaped stirrup member 56. The bracket 50 formed in this way has with relatively low weight a very great stiffness and strength. It further permits a very reliable securing on the frame 13 both in the longitudinal direction and in the transverse direction, the widest point of the bracket 50 bearing either on the bent longitudinal support 16 (FIG. 3) or on the transverse arms 46 (FIG. 2) thereof.

The support arm 60 serves to secure the baffle plate 11 to the bracket 50. Depending on whether the baffle plate 11 is to be arranged in the longitudinal direction of the baffle plate support 12 (FIG. 2) or laterally adjacent the baffle plate support 12 (FIG. 3), two different support arms 60 are used. In both cases the support arm 60 has the form of a bent rod whose vertical leg is secured by means of screws 61 to the flange 54 of the support plate 50 whilst the free end of the horizontal leg is connected via a serrated rotary joint coupling 62 to the baffle plate 11. The rotary joint coupling 62 permits adjustment of the angle of attack of the baffle plate 11. The two support arms 60 for the longitudinal securing (FIG. 2) and for the transverse securing (FIG. 3) differ essentially only in that the rotation axis of the rotary joint coupling 62 for the transverse securing lies coaxial to the axis of the horizontal leg of the support arm 60 whilst for the longitudinal securing it lies transversely of said axis.

The division of the cantilever arm 14 into the bracket 50 and the support arm 60 has the advantage that the same bracket 50 can be used for the longitudinal securing and for the transverse securing so that for changing the type of securing only the relatively simple and cheap support arm 60 need be changed.

On the frame 45 the auxiliary means necessary for operating the bulk flow meter are also disposed. Thus, FIG. 2 shows a force or displacement sensor 70 which is secured by means of an angle member 71 to the profile frame 24. An arm 72 secured to the plate 17 of the frame 13 is connected to the actuating pin 73 of the sensor 70 so that the horizontal force component exerted on the baffle plate 11 or the horizontal displacement of the baffle plate support 12 caused thereby can be directly transmitted to the sensor 70. The force or displacement sensor can of course be of any type known or suitable for bulk flow meters.

Also secured to the profile arm 24 is a damper 75 which is connected via an arm 76 to the baffle plate support 12 for damping the movements of the movable system 10.

The corrugated diaphragms 20 and 30 may be made from any suitable spring metal, for example from spring steel sheet of 0.2 mm thickness or also of bronze spring sheet. The corrugations may be made relatively flat, for example with an amplitude of 2.5 mm on either side of the centre plane, because the maximum deflection of the spring systems is very small; for example, it is about 2.4 mm when using an inductive displacement sensor. By corresponding dimensioning of the corrugated diaphragms (for example about 320×170 mm) it is readily possible to obtain measuring force/transverse force ratios which are greater than 1:100.

As already mentioned the construction of the frame 45 with cylindrical connecting members 40, 41, 42, 43 lying parallel to the corrugated diaphragms 20, 30 permits adjustment of the pretensioning of the corrugated diaphragms in simple manner. The pretensioning of the corrugated diaphragms 20, 30 depends on the distance between the profile frames 24 and 25. This distance can easily be varied by varying the length of the cylindrical connecting members or by inserting disc-shaped spacers. In this manner an exact calibration of the bulk flow meter is possible.

Temperature-induced length changes of the corrugated diaphragms 20, 30 also influence the pretensioning thereof and thus the measurement result. This temperature dependence can be completely compensated by suitable construction of the cylindrical connecting members 40, 41, 42, 43. For this purpose they are so constructed that their length varies in dependence upon the temperature in the same manner as the length of the corrugated diaphragms 20, 30. This can be done in particular in that they are made up of sub-sections which consist of different materials. Thus, in FIG. 3 the cylindrical connecting member 40 consists of two sub-sections 40a and 40b, the sub-section 40a consisting for example of aluminium and the sub-section 40b of brass. The remaining connecting members 41, 42, 43 are of course formed in the same manner. By suitable dimensioning of the sub-sections and choice of the materials adaptation of the temperature compensation to the particular type of corrugated diaphragms used is possible.

The measurement range of the bulk flow meter depends on the properties of the corrugated diaphragms. By the dimensioning of the corrugated diaphragms the bulk flow meter can be designed for specific measurement ranges.

A change of the measurement range is possible by replacing the corrugated diaphragms. Another possibility for changing the measurement range is to connect several corrugated diaphragms in parallel in each spring system. The corrugated diaphragms of each system are arranged for this purpose parallel to each other slightly spaced apart with interposition of spacing strips and jointly clamped at the frame 45 and the frame 13 of the baffle plate support 12.

Various modifications of the bulk flow meter described will readily be apparent to the expert. Thus, it is possible to form each corrugated diaphragm from two separate halves which are joined together by the clamping at the baffle plate support. Also, the baffle plate support could be connected via more than two spring systems to the frame.

I claim:

1. A bulk flow meter for measuring the flow of a bulk material, the improvement comprising a main frame and at least one baffle plate which is disposed in the flow and is connected to a rigid support so that it is inclined with respect to the direction of flow, said rigid support being mounted displaceably in the direction of a horizontal axis by at least two spring systems which are in spaced relationship with each other and are secured to both the baffle plate support and to the main frame, each spring system comprising two spring members disposed on opposite sides of the baffle plate support, and each spring member being formed by a corrugated diaphragm section which has straight, parallel, vertical corrugations and is secured to the main frame by a vertical edge portion that is parallel to the corrugations.

2. Bulk flow meter according to claim 1 in which the two spring members of each pair of spring systems are formed by two corrugated sections of a continuous corrugated diaphragm which is secured by edge portions to the main frame and at a center portion to the baffle plate support.

3. Bulk flow meter according to claim 1 in which each spring system includes a plurality of corrugated diaphragms arranged parallel to each other.

4. Bulk flow meter according to claim 1 in which the baffle plate support comprises a support frame disposed between the corrugated diaphragm sections and a cantilever arm attached to the support frame and carrying the baffle plate.

5. Bulk flow meter according to claim 4 in which the cantilever arm is adapted to be connected to the support frame along a longitudinal axis of the support frame.

6. Bulk flow meter according to claim 5 in which the cantilever arm comprises a bracket secured to the support frame and a support arm secured to the bracket.

7. Bulk flow meter according to claim 1 in which the main frame comprises at least two compensating connecting members which are disposed parallel to the corrugated diaphragms and which have the same temperature dependence of the change in length as the corrugated diaphragms.

8. Bulk flow meter according to claim 7 in which each compensating connecting member includes a plurality of subsections which consist of different materials.

9. Bulk flow meter according to claim 7 in which the compensating connecting members determine the distances between the main frame members to which the edge portions of the corrugated diaphragms are secured.

10. Bulk flow meter according to claim 4 in which the cantilever arm is adapted to be connected to the support frame along an axis transverse to a longitudinal axis of the support frame.

* * * * *